United States Patent
Ohtani

(10) Patent No.: US 8,390,798 B2
(45) Date of Patent: Mar. 5, 2013

(54) WAVELENGTH DISPERSION MEASUREMENT METHOD AND DEVICE AND OPTICAL TRANSMISSION SYSTEM

(75) Inventor: Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 13/030,700

(22) Filed: Feb. 18, 2011

(65) Prior Publication Data
US 2011/0205531 A1    Aug. 25, 2011

(30) Foreign Application Priority Data

Feb. 23, 2010 (JP) .................. 2010-036895

(51) Int. Cl.
*G01N 21/00* (2006.01)
*H04B 10/12* (2006.01)
(52) U.S. Cl. ...................... 356/73.1; 398/147
(58) Field of Classification Search ............ 356/73.1, 356/323–325; 398/43–103
See application file for complete search history.

(56) References Cited

U.S. PATENT DOCUMENTS

| 5,973,816 A | 10/1999 | Akiyama et al. |
| 6,738,584 B1 * | 5/2004 | Tsuda et al. ............. 398/147 |
| 6,871,024 B2 | 3/2005 | Nishimoto et al. |

FOREIGN PATENT DOCUMENTS

| JP | 63-218837 | 9/1988 |
| JP | 06-3452 | 1/1994 |
| JP | 11-72761 | 3/1999 |
| JP | 2000-329650 | 11/2000 |
| JP | 2002-208892 | 7/2002 |

* cited by examiner

Primary Examiner — Tara S Pajoohi Gomez
(74) Attorney, Agent, or Firm — Fujitsu Patent Center

(57) ABSTRACT

A wavelength dispersion measurement method includes generating a plurality of test lights in the first terminal, the wavelengths of which are different from a wavelength of a signal light, multiplexing each test light with the signal light and outputting the multiplexed light to the first transmission path, reconverting each electrical signal after converting each beam into electrical signals, multiplexing each test light with the signal light and outputting the multiplexed light to the second transmission path, reconverting each electrical signal after converting each test light into electrical signals, multiplexing each test light with the signal light and outputting the multiplexed light to the first transmission path, measuring times for each test light to be propagated up to a specified number of go-around, and measuring a change of a wavelength dispersion amount in the paths based on a difference between the measured propagation times of each wavelength.

13 Claims, 10 Drawing Sheets

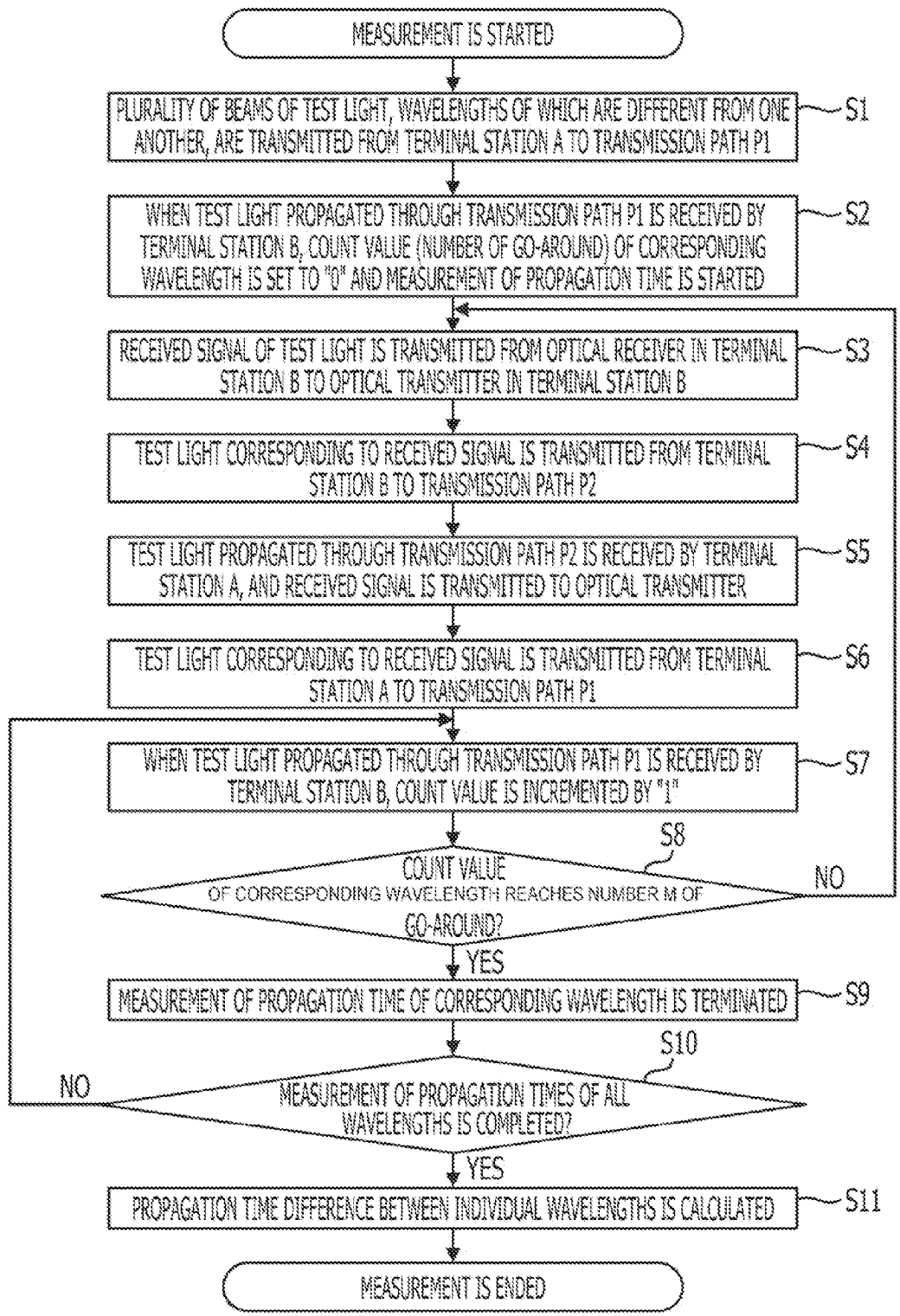

FIG. 7

|  | $\lambda_S$ | $\lambda_M$ | $\lambda_L$ |
|---|---|---|---|
| (a) | PROPAGATION TIME CORRESPONDING TO 1000 OF GO-ROUND | PROPAGATION TIME CORRESPONDING TO 1000 OF GO-ROUND | PROPAGATION TIME CORRESPONDING TO 1000 OF GO-ROUND |
| (b)+(c) | TIME REQUIRED FOR 4000 OF ELECTRICAL/OPTICAL CONVERSION | TIME REQUIRED FOR 4000 OF ELECTRICAL/OPTICAL CONVERSION | TIME REQUIRED FOR 4000 OF ELECTRICAL/OPTICAL CONVERSION |

PROPAGATION TIME DIFFERENCE (indicated between top of $\lambda_S$ column and top of $\lambda_L$ column)

WAVELENGTH DISPERSION MEASUREMENT METHOD AND DEVICE AND OPTICAL TRANSMISSION SYSTEM

CROSS-REFERENCE TO RELATED APPLICATIONS

This application is based upon and claims the benefit of priority of the prior Japanese Patent Application No. 2010-36895 filed on Feb. 23, 2010, the entire contents of which are incorporated herein by reference.

FIELD

The present embodiment relates to a method and a device, used for measuring a change in the wavelength dispersion characteristic of a transmission path, and an optical transmission system that optimizes a tunable dispersion compensator, using the measurement result thereof.

BACKGROUND

It is noted that the waveform distortion of signal light transmitted through an optical fiber occurs owing to the effect of the wavelength dispersion characteristic of the optical fiber that the propagation velocity of the signal light differs depending on a difference in the wavelength thereof. Currently, in an optical transmission system that uses a wavelength division multiplexing (WDM) method the transmission rate of which is greater than or equal to 40 Gbps, a tunable dispersion compensator (TDC) is installed just before an optical receiver corresponding to each wavelength, in order to adjust a wavelength dispersion amount in each wavelength. For example, as described in Japanese Laid-open Patent Publication No. 2002-208892, the bit error rate (BER) of signal light received in an optical receiver is measured during system start-up so that the dispersion compensation amount in the TDC is optimized in response to the wavelength dispersion characteristic of a transmission path in which an optical fiber is used. Using the measurement value as a parameter for the optimization, the dispersion compensation amount in the TDC can be precisely adjusted to an optimum level.

When the above-mentioned optimization of the dispersion compensation amount in which the BER is used as a parameter is also applied during a system operation, the wavelength dispersion characteristic of the transmission path changes owing to environmental conditions such as a temperature change and the like or time degradation. For example, as illustrated in FIG. 1, there is a possibility that a curved line indicating the relationship of the BER to a dispersion compensation amount in a TDC changes from a state indicated by a dashed line to a state indicated by a solid line. In this case, it is difficult to determine whether it is desirable to increase or decrease the dispersion compensation amount in the TDC from the optimum point A1, on the basis of the measurement value B1' of the BER after the change with respect to the optimum point A1 of a dispersion compensation amount before the change. Namely, when the wavelength dispersion characteristic of the transmission path changes during the system operation, it is difficult to determine the adjustment direction for the optimization of the dispersion compensation amount by simply measuring the BER. As a commonly used technique for avoiding such a situation as described above, there has been a technique in which the dispersion compensation amount in the TDC is changed in both increasing and decreasing directions by requirements, then the BER is measured, and hence the dispersion compensation amount is adjusted in a direction in which the measurement value becomes relatively small, thereby promoting the optimization.

In the optimization of the dispersion compensation amount in the TDC, a wavelength dispersion amount on a transmission path with respect to a signal light having a corresponding wavelength is indirectly obtained on the basis of the BER measured at a receiving end. With respect to techniques for measuring the wavelength dispersion amount on the transmission path, there have been various methods other than the above-mentioned utilization of the BER. For example, there has been disclosed a technique in which a plurality of optical pulses the wavelengths of which are different from one another are transmitted from one end of a transmission path and returned from the other end thereof, the individual optical pulses travelling back and forth on the transmission path are detected, and hence a wavelength dispersion amount is measured on the basis of a corresponding group delay. In addition, there has been disclosed a technique in which a wavelength dispersion amount is measured on the basis of the group delay of an optical pulse caused to travel back and forth more than once on a same transmission path.

Incidentally, when, as described above, the direction of the optimization is determined by increasing and decreasing the dispersion compensation amount in the TDC, the measured BER depends on the quality of a signal light received by an optical receiver. The signal quality is mainly influenced by the level of amplified spontaneous emission (ASE) light occurring when the signal light is optically amplified on the transmission path. The level of the ASE light at a receiving end changes depending on a transmission state such as the transmission distance of the signal light, the number of optical relays (the number of spans), or the like. When the level of the ASE light at the receiving end is high, namely, an optical signal to noise ratio (OSNR) is low, the value of the BER drifts upward at the optimum point of the dispersion compensation amount as illustrated in FIG. 2, in the above-mentioned relationship of the BER to the dispersion compensation amount illustrated in FIG. 1. Accordingly, since the range within which the dispersion compensation amount in the TDC can be adjusted (for example, portions indicated by heavy lines in FIG. 2) narrows, it turns out that a possibility for obtaining an optimum point is reduced. Specifically, when the dispersion compensation amount is increased or decreased in order to determine the direction of the optimization, there is a possibility that the degradation of the signal quality occurs that exceeds a limit within which a forward error correction (FEC) circuit in an optical receiver can correct an error (BER=1*$10^{-3}$ indicated by a dashed line in the example illustrated in FIG. 2). When such a degradation of the signal quality as described above occurs, it turns out that it is difficult to measure the BER of the signal light, and hence it is difficult to optimize the dispersion compensation amount on the basis of the BER.

In addition, considering a case in which, by applying, in place of the measurement of the BER, a technique of the related art in which the wavelength dispersion amount is measured on the basis of the group delay of the optical pulse caused to travel back and forth on the transmission path, as described above, the optimization of the dispersion compensation amount in the TDC is promoted, a commonly used optical transmission system includes an optical amplifier on a transmission path, and usually an optical isolator is disposed at the input-output portion of the optical amplifier. While the optical isolator allows passage of an optical pulse transmitted from one end of a transmission path and transmitted to the other end thereof, the optical isolator blocks return light reflected from the other end of the transmission path. Therefore, it is difficult to apply the method, in which an optical pulse is caused to travel back and forth on the same transmission path and then the wavelength dispersion amount is measured, to the optimization of the dispersion compensation amount in the TDC in the commonly used optical transmission system. Furthermore, in a case in which it is assumed that an optical transmission system includes no optical amplifier on a transmission path, since an optical pulse travels back and forth on a same transmission path, the power of the optical pulse is reduced owing to the loss of the transmission path. The reduction of the power of the optical pulse becomes noticeable with increase in the number of times the optical pulse travels back and forth on the transmission path. Since the detectable level of the optical pulse is limited, the number of times the optical pulse travels back and forth is restricted. Therefore, if the number of times the optical pulse travels back and forth decreases, it is difficult to measure the wavelength dispersion amount with a required accuracy. Even if the number of times the optical pulse travels back and forth can be increased, the waveform distortion of the optical pulse due to the effect of the wavelength dispersion occurs with increase in the number of times the optical pulse travels back and forth, and hence it is difficult to correctly perform timing detection. Therefore, the measurement accuracy of the wavelength dispersion amount is inevitably reduced.

SUMMARY

According to an aspect of the disclosed embodiments, a wavelength dispersion measurement method with respect to an optical transmission system in which signal light transmitted from a first terminal station and propagated through a first transmission path is received by a second terminal station, and signal light transmitted from the second terminal station and propagated through a second transmission path different from the first transmission path is received by the first terminal station, the wavelength dispersion measurement method includes generating in the first terminal station a plurality of test lights, the wavelengths of which are different from a wavelength of the signal light propagated between the first and the second terminal stations, multiplexing each test light with the signal light and outputting the multiplexed light from the first terminal station to the first transmission path, reconverting each electrical signal into each test light after receiving in the second terminal station each test light propagated through the first transmission path and converting each test light into electrical signals, multiplexing each test light with the signal light and outputting the multiplexed light from the second terminal station to the second transmission path, reconverting each electrical signal into each test light after receiving in the first terminal station each test light propagated through the second transmission path and converting each test light into electrical signals, multiplexing each test light with the signal light and outputting the multiplexed light from the first terminal station to the first transmission path, measuring times for each test light to be propagated up to a specified number of go-around, with respect to each wavelength, and measuring a change of a wavelength dispersion amount in the first and the second transmission paths based on a difference between the measured propagation times of each wavelengths.

The object and advantages of the disclosed embodiments will be realized and attained by means of the elements and combinations particularly pointed out in the claims.

It is to be understood that both the foregoing general description and the following detailed description are exemplary and explanatory and are not restrictive of the disclosed embodiments, as claimed.

BRIEF DESCRIPTION OF DRAWINGS

FIG. 6 is a flowchart illustrating a measurement method for the change of a wavelength dispersion amount, performed in a wavelength dispersion measurement device;

FIG. 7 is a conceptual diagram for explaining a propagation time difference of test light with respect to each wavelength;

DESCRIPTION OF EMBODIMENTS

Embodiments are described in detail below with reference to the accompanying drawings.

Figure 1:
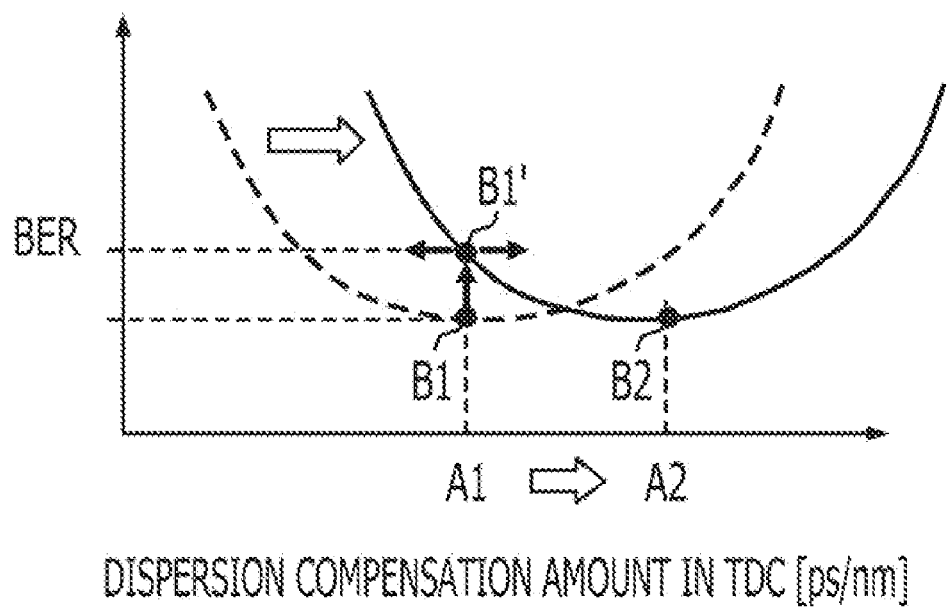
FIG. 1 is a diagram illustrating how a relationship of a BER to a dispersion compensation amount in a TDC changes owing to the change of a wavelength dispersion characteristic of a transmission path.
Figure 2:
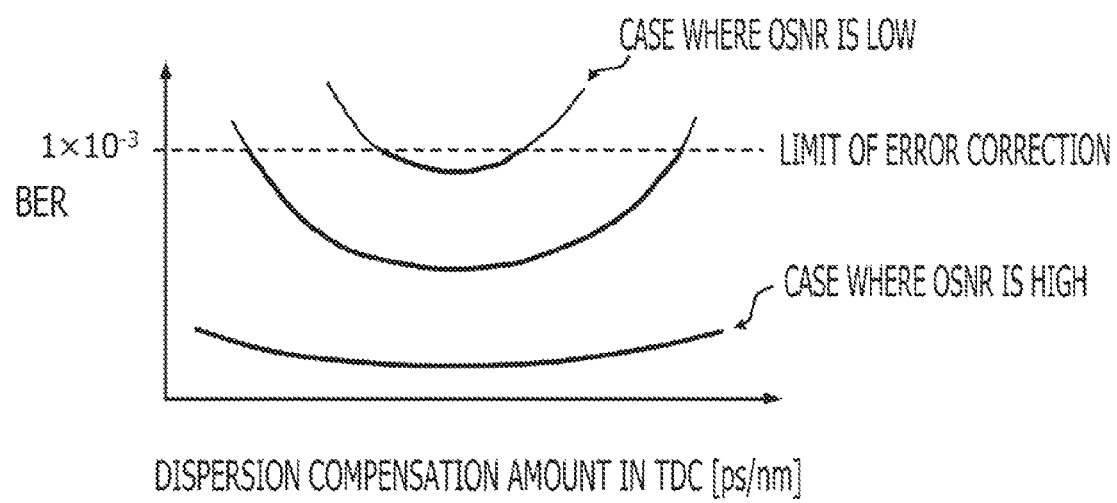
FIG. 2 is a diagram illustrating how a BER changes owing to an OSNR with respect to an optimum point of a dispersion compensation amount.
Figure 3:
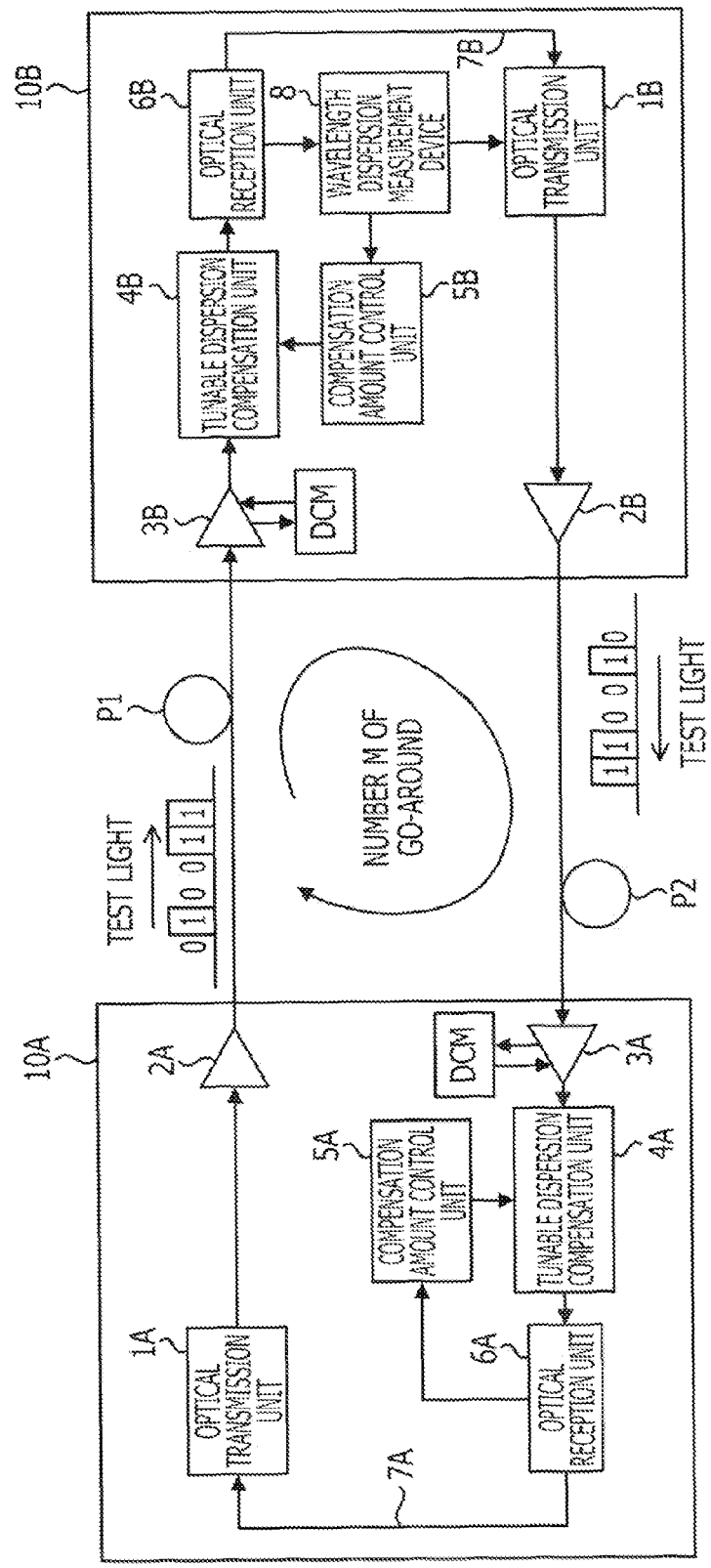
FIG. 3 is a block diagram illustrating a configuration of an embodiment of an optical transmission system.

FIG. 3 is a block diagram illustrating the configuration of an embodiment of an optical transmission system.

In FIG. 3, in the optical transmission system, for example, a pair of transmission paths P1 and P2 establish a connection between a terminal station 10A and a terminal station 10B that face each other, and WDM light into which a plurality of signal light whose wavelengths are different from one another are multiplexed is bi-directionally transmitted between the terminal stations 10A and 10B.

The terminal station 10A includes an optical transmission unit 1A, which generates the WDM light to be transmitted to the terminal station 10B, and a transmitting-side optical amplification unit 2A that collectively amplifies and transmits the WDM light generated in the optical transmission unit 1A to a transmission path P1. The optical transmission unit 1A has a function of generating test light used for measuring the change of a wavelength dispersion amount, using light, the wavelength of which is different from the wavelength of each channel of the WDM light, or an unused channel of the WDM light. In addition, the detail of the test light will be described later.

In addition, the terminal station 10A includes a receiving-side optical amplification unit 3A that collectively amplifies to a required level the WDM light transmitted from the terminal station 10B and propagated through the transmission path P2 and is equipped with a fixed dispersion compensator (DCM) capable of collectively compensating wavelength dispersion occurring in the transmission path P2, a tunable dispersion compensation unit 4A that compensates residual wavelength dispersion, which is not compensated by the receiving-side optical amplification unit 3A, with respect to individual wavelengths, a compensation amount control unit 5A that controls a dispersion compensation amount in the tunable dispersion compensation unit 4A, which corresponds to each wavelength, and an optical reception unit 6A that performs a reception processing operation on signal light of each wavelength, output from the tunable dispersion compensation unit 4A, or the test light. Furthermore, the terminal station 10A includes a signal line 7A that establishes a connection between the optical reception unit 6A and the optical transmission unit 1A. When the test light is received by the optical reception unit 6A, the signal line 7A transmits the received signal from the optical reception unit 6A to the optical transmission unit 1A.

The terminal station 10B includes an optical transmission unit 1B that generates the WDM light to be transmitted to the terminal station 10A and a transmitting-side optical amplification unit 2B that collectively amplifies to a required level the WDM light generated in the optical transmission unit 1B and transmits the amplified WDM light to the transmission path P2. In the same way as the optical transmission unit 1A in the terminal station 10A, the optical transmission unit 1B also has a function of generating test light using light, the wavelength of which is different from the wavelength of each channel of the WDM light, or an unused channel of the WDM light.

In addition, the terminal station 10B includes a receiving-side optical amplification unit 3B that collectively amplifies to a required level the WDM light transmitted from the terminal station 10A and propagated through the transmission path P1 and is equipped with a DCM capable of collectively compensating wavelength dispersion occurring in the transmission path P1, a tunable dispersion compensation unit 4B that compensates residual wavelength dispersion, which is not compensated by the receiving-side optical amplification unit 3B, with respect to individual wavelengths, a compensation amount control unit 5B that controls a dispersion compensation amount in the tunable dispersion compensation unit 4B, which corresponds to each wavelength, and an optical reception unit 6B that performs a reception processing operation on signal light of each wavelength, output from the tunable dispersion compensation unit 4B, or the test light. Furthermore, the terminal station 10B includes a signal line 7B that establishes a connection between the optical reception unit 6B and the optical transmission unit 1B. When the test light is received by the optical reception unit 6B, the signal line 7B transmits the received signal from the optical reception unit 6B to the optical transmission unit 1B.

In addition, the terminal station 10B includes a wavelength dispersion measurement device 8 that measures the change of a wavelength dispersion amount in the transmission paths P1 and P2 on the basis of the reception result of the test light in the optical reception unit 6B. The wavelength dispersion measurement device 8 measures, for each wavelength, a time required for each test light to be propagated in the system up to a specified number M of go-around, with respect to a plurality of test lights, the wavelengths of which are different from one another, and measures the change of the wavelength dispersion amount in the transmission paths P1 and P2 on the basis of a propagation time difference between wavelengths. As we used herein, the term go-around refers to the test light is propagated through the transmission path P1, the terminal station 10B, and the transmission path P2, and is received by the terminal station 10A. The measurement result of the wavelength dispersion measurement device 8 is delivered to the compensation amount control unit 5B, and is also delivered from the optical transmission unit 1B to the compensation amount control unit 5A in the terminal station 10A through the transmission path P2.

Figure 4:
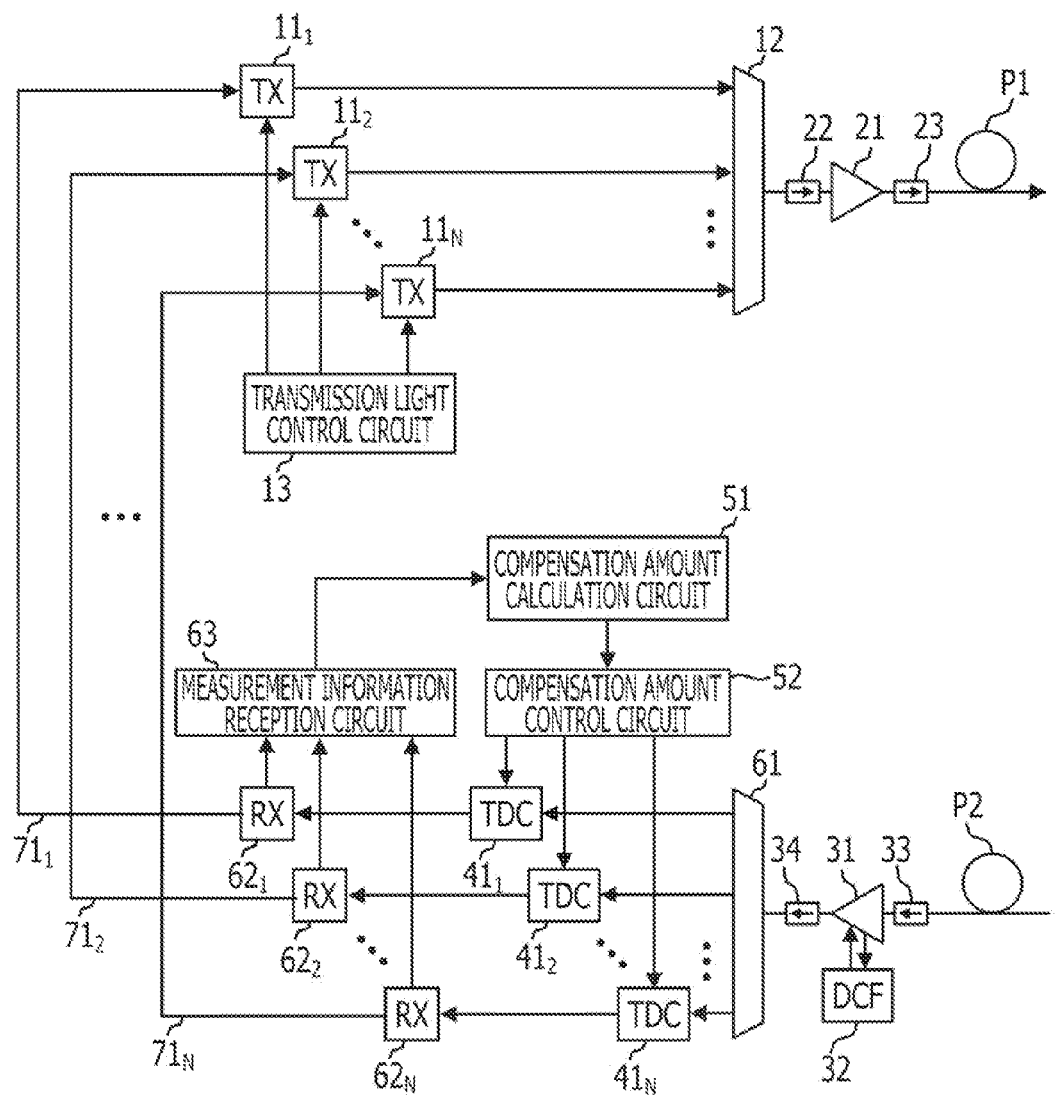
FIG. 4 is a block diagram illustrating a specific example of a configuration of a terminal station.

FIG. 4 is a block diagram illustrating a specific example of the configuration of the above-mentioned terminal station.

In the example of the configuration in FIG. 4, N optical transmitters (TX) $11_1, 11_2, \ldots,$ and $11_N$ are provided on the transmitting side of the terminal station. Each of the optical transmitters $11_1$ to $11_N$ can output signal lights, the wavelengths of which are different from one another, or test light. After output light from the individual optical transmitters $11_1$ to $11_N$ are multiplexed into one beam by a multiplexer 12, the output light is collectively amplified by a postamplifier 21 and transmitted to the transmission path P1. As we used herein, the term output light refers to both the signal lights and the test light. Optical isolators 22 and 23 are connected to the input-output port of the postamplifier 21. A transmission light control circuit 13 controls output light (signal light or test light) generated in each of the optical transmitters $11_1$ to $11_N$, in response to the setting of an operation channel for the WDM light to be transmitted to the terminal station and the measurement timing of the wavelength dispersion amount.

In addition, with respect to the receiving side of the terminal station, the WDM light propagated through the transmission path P2 is supplied to a preamplifier 31. A dispersion compensating fiber (DCF) 32 is connected to the preamplifier 31, and the compensation of losses of signal light for each wavelength and test light, which are propagated through the transmission path P2, and the wavelength dispersion is collectively performed with respect to all wavelengths. In the same way as the above-mentioned postamplifier 21, optical isolators 33 and 34 are also connected to the input-output port of the preamplifier 31. Output light from the preamplifier 31 is demultiplexed by a demultiplexer 61 into individual wavelengths, and, after that, is input to tunable dispersion compensators (TDC) $41_1, 41_2, \ldots,$ and $41_N$ corresponding to the individual wavelengths. In each of the TDCs $41_1$ to $41_N$, the compensation of wavelength dispersion remaining in the input light (i.e., the light input into each of the TDCs $41_1$ to $41_N$) is performed on the basis of the dispersion compensation amount controlled in accordance with the output signal from the compensation amount control circuit 52. Corresponding optical receivers (RX) $62_1, 62_2, \ldots,$ and $62_N$ perform reception processing operations on output light from the TDCs $41_1$ to $41_N$, respectively.

When the test light is received by one of the optical receivers $62_1$ to $62_N$ in the terminal station, the received signal is transmitted to one of the optical transmitters $11_1$ to $11_N$, the wavelength of which corresponds to the wavelength of the received signal, through the signal line 7B. In addition, when signal light indicating measurement information obtained in the wavelength dispersion measurement device 8 in the terminal station is received by one of the optical receivers $62_1$ to $62_N$, the received signal is output to a measurement information reception circuit 63 to obtain the measurement information, and the measurement information is delivered to a compensation amount calculation circuit 51. In the compensation amount calculation circuit 51, the optimum level of a dispersion compensation amount in each of the TDCs $41_1$ to $41_N$ is calculated on the basis of the measurement information from the measurement information reception circuit 63, and the calculation result is delivered to the compensation amount control circuit 52. In the compensation amount control circuit 52, in accordance with the calculation result of the compensation amount calculation circuit 51, a control operation is performed in which a dispersion compensation amount in each of the TDCs $41_1$ to $41_N$ is adjusted to the optimum level.

Figure 5:
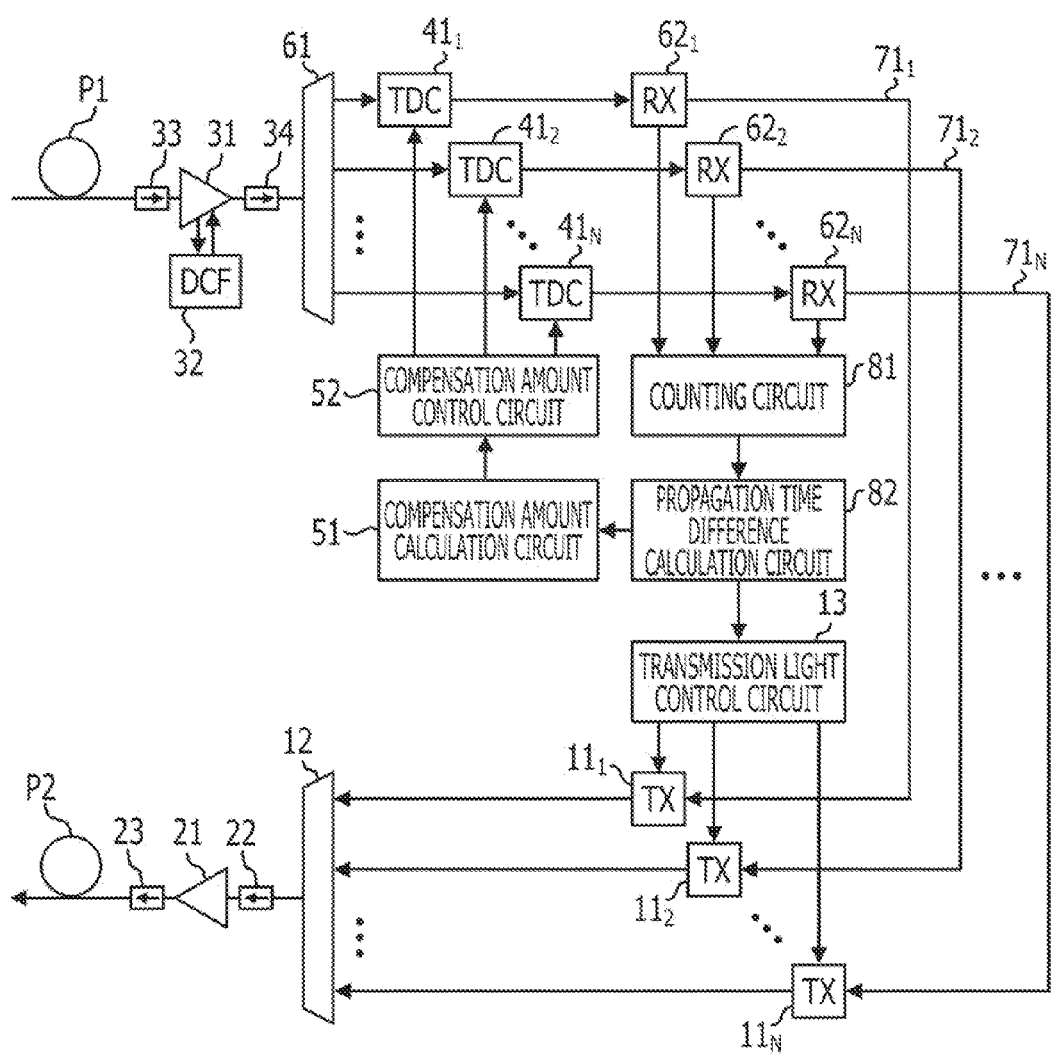
FIG. 5 is a block diagram illustrating a specific example of a configuration of a terminal station.

FIG. 5 is a block diagram illustrating a specific example of the configuration of the above-mentioned terminal station. In addition, in the example of the configuration in FIG. 5, the same symbol is assigned to an element corresponding to that in the example of the configuration of the terminal station illustrated in FIG. 4. The example of the configuration in FIG. 5 differs from the example of the configuration in FIG. 4 in that a relationship between a transmitting side and a receiving side is reversed with respect to the transmission paths P1 and P2, and a counting circuit 81 and a propagation time difference calculation circuit 82, which function as the wavelength dispersion measurement device 8, are provided in place of the measurement information reception circuit 63 in the terminal station in FIG. 4.

The above-mentioned counting circuit 81 individually counts the number of times the test light transmitted from the terminal station and propagated through the transmission path P1 is received by each of the optical receivers $62_1$ to $62_N$ in the terminal station, with respect to each reception wavelength, and delivers a count value corresponding to each reception wavelength to the propagation time difference calculation circuit 82. The propagation time difference calculation circuit 82 measures, in response to the count value obtained in the counting circuit 81, a time required for the test light to be propagated in the system up to a specified number M of go-around with respect to each wavelength of the test light, and calculates a propagation time difference between individual wavelengths in the test light using the measurement result. As described in detail later, the propagation time difference between wavelengths in the test light corresponds to the change of a wavelength dispersion amount in the transmission paths P1 and P2, and here the value of the propagation time difference calculated in the propagation time difference calculation circuit 82 is output, as the measurement information of the change of a wavelength dispersion amount, to the compensation amount calculation circuit 51 and the transmission light control circuit 13 in the terminal station.

Next, an operation performed in the optical transmission system according to the present embodiment will be described.

In the optical transmission system having such a configuration as described above, during system start-up, by applying a technique of the related art such as an existing method or the like in which a dispersion compensation amount is optimized using an BER as a parameter, first the initial setting of a dispersion compensation amount is performed for each of the TDCs $41_1$ to $41_N$ individually disposed on the receiving side of each terminal station. Specifically, signal light used for an initial setting is generated in each of the optical transmitters $11_1$ to $11_N$ in the terminal station, and the individual signal light are propagated through the transmission path P1 (transmission path P2) to be received by the individual optical receivers $62_1$ to $62_N$ in the terminal station. Accordingly, the dispersion compensation amount in each of the TDCs $41_1$ to $41_N$ corresponding to the signal light is initialized so that the measurement value of the BER of each received signal becomes less than or equal to a specified initial value.

In addition, while, as described above, the wavelength dispersion characteristics of the transmission paths P1 and P2 change owing to environmental conditions or time degradation, the changes occur over a relatively long term, and hence, substantially, the wavelength dispersion characteristics of the transmission paths P1 and P2 do not change rapidly during an initial setting operation performed at system start-up. Therefore, it is not necessary to increase and decrease the dispersion compensation amount in order to determine the direction of optimization during the initial setting operation performed at system start-up, and the dispersion compensation amount in the TDC can be initialized using the BER as a parameter.

When the initial setting operation during system start-up is completed and the operation of the system is started, the measurement of the change of a wavelength dispersion amount in the transmission paths P1 and P2 is performed by the counting circuit 81 and the propagation time difference calculation circuit 82 in the wavelength dispersion measurement device 8 disposed in the terminal station. Hereinafter, an example of a measurement method for the change of a wavelength dispersion amount, performed by the wavelength dispersion measurement device 8, will be specifically described with reference to a flowchart illustrated in FIG. 6.

After the operation of the system is started, first in Step 1 (illustrated as 51 in FIG. 6, and the similar expression is applied, hereinafter) in FIG. 6, a plurality of test lights, the wavelengths of which are different from one another are generated in the optical transmission unit 1A in the terminal station. The wavelengths of the test light are set to wavelengths different from the wavelength of the currently operated signal light within a range including the signal band of the WDM light transmitted between the terminal stations and the neighborhood of the signal band. In the present embodiment, at least two optical transmitters that are selected from among the N optical transmitters (TX) $11_1$ to $11_N$ provided in the optical transmission unit 1A and correspond to unused channels of the WDM light are used for generating the test light. The switching of the signal light and the test light generated in the individual optical transmitters $11_1$ to $11_N$ is controlled in accordance with an output signal from the transmission light control circuit 13.

In addition, while, here, the test light is generated using the unused channels of the WDM light, dedicated optical transmitters used for generating the test light may be individually provided in the optical transmission units 1A and 1B in the individual terminal stations, in addition to the optical transmitters for the signal light. With respect to the optical transmitter for the signal light, at least an optical transmitter capable of generating the test light located in the vicinity of the shortest wavelength of the WDM light and an optical transmitter capable of generating the test light located in the vicinity of the longest wavelength of the WDM light may be provided, or an optical transmitter the output wavelength of which is variable may be provided and the output wavelength thereof may be controlled so as to become a plurality of wavelengths different from the wavelengths of the signal light, thereby generating the test light. In addition, a TDC and an optical receiver, used for the test light, are individually provided on the receiving side of each terminal station so as to correspond to an optical transmitter for the above-mentioned test light, and a connection between the optical receiver for the test light and the optical transmitter therefor, which are located in the same terminal station, is established using a signal line. In this case, a signal line establishing a connection between an optical receiver for the signal light and an optical transmitter therefor may be omitted.

Since it is only necessary to detect the reception of the test light in the optical receivers $62_1$ to $62_N$ in a facing station, which have corresponding wavelengths, it is not particularly necessary for the signal pattern of the test light to configure a frame. In addition, since, as described later, the number of go-around of the test light is also counted in the counting circuit 81 in the terminal station, the signal pattern of the test light may be a simple pattern including no count value. Specifically, for example, a pseudo random pattern (110010), illustrated in the middle of FIG. 3, or the like may be applied to the test light. In this regard, however, the signal pattern of the test light is not limited to the above-described example.

After the test light of each wavelength, generated in an optical transmitter corresponding to an unused channel of the terminal station, is multiplexed with a currently operated signal light generated in another optical transmitter, by the multiplexer 12, the test light is collectively amplified in the postamplifier 21 and transmitted to the transmission path P1. With respect to the signal light of each wavelength and the test light, propagated through the transmission path P1, the losses thereof in the transmission path P1 are collectively compensated by the preamplifier 31 in the terminal station, and the wavelength dispersion thereof in the transmission path P1 is collectively compensated by the DCF 32 connected to the preamplifier 31. In addition, with respect to the signal light and the test light demultiplexed by the demultiplexer 61 into individual wavelengths, after residual wavelength dispersion, which is not compensated by the DCF 32, is compensated by the TDCs $41_1$ to $41_N$ corresponding to the signal light and the test light, in accordance with a dispersion compensation amount initially set during system start-up, the signal light and the test light are individually received by the optical receivers $62_1$ to $62_N$.

Subsequently, in Step 2 in FIG. 6, when the signal pattern of the test light is detected on the basis of reception processing operations performed in the individual optical receivers $62_1$ to $62_N$ in the terminal station, a corresponding optical receiver outputs a signal indicating the reception of the test light to the counting circuit 81. Namely, by receiving output signals from individual optical receivers corresponding to at least two test lights, the wavelengths of which are different from one another, the counting circuit 81 detects that the test light of each wavelength, transmitted from the terminal station and propagated through the transmission path P1, is received by a corresponding optical receiver in the terminal station. Accordingly, the counting circuit 81 sets a count value (the number of go-around) corresponding to the wavelength of the test light to "0". Count values in the counting circuit 81, which correspond to individual wavelengths, are output to the propagation time difference calculation circuit 82 as needed. The propagation time difference calculation circuit 82 starts measuring the propagation time of the test light from a time when the count value has become "0".

In Step 3, an optical receiver that has received the test light of the terminal station outputs to the signal line 71 a received signal that is an electrical signal into which the test light is converted. Accordingly, the received signal of the test light is transmitted to a corresponding optical transmitter in the same terminal station.

In Step 4, in the optical transmitter to which the received signal of the test light has been transmitted, the received signal is converted into an optical signal, thereby generating the test light such as a pseudo random pattern or the like. After the test light is multiplexed with a currently operated signal light by the multiplexer 12 in the terminal station, the test light is collectively amplified by the postamplifier 21 and transmitted to the transmission path P2. With respect to the signal light of each wavelength and the test light, propagated through the transmission path P2, the losses thereof and the wavelength dispersion thereof in the transmission path P1 are collectively compensated by the preamplifier 31 and the DCF 32 in the terminal station, respectively, and the signal light and the test light are demultiplexed by the demultiplexer 61 into individual wavelengths. In addition, with respect to the signal light and the test light, after residual wavelength dispersion, which is not compensated by the DCF 32, is compensated by the individual TDCs $41_1$ to $41_N$, in accordance with a dispersion compensation amount initially set during system start-up, the signal light and the test light are individually received by the optical receivers $62_1$ to $62_N$.

In Step 5, when the signal pattern of the test light is detected on the basis of reception processing operations performed in the individual optical receivers $62_1$ to $62_N$ in the terminal station, a corresponding optical receiver outputs to the signal line 71 a received signal that is an electrical signal into which the test light is converted, and hence the received signal of the test light is transmitted to a corresponding optical transmitter in the same terminal station.

In Step 6, in the optical transmitter to which the received signal of the test light has been transmitted, the received signal is converted into an optical signal, thereby generating the test light. After the test light is multiplexed with a currently operated signal light by the multiplexer 12 in the terminal station, the test light is collectively amplified by the postamplifier 21 and transmitted to the transmission path P1.

In Step 7, in the same way as in Step 2 described above, the signal pattern of the test light is detected on the basis of reception processing operations performed in the individual optical receivers $62_1$ to $62_N$ in the terminal station, and a corresponding optical receiver outputs a signal indicating the reception of the test light to the counting circuit 81. Accordingly, a count value corresponding to the wavelength of the test light is incremented by one.

In Step 8, in the propagation time difference calculation circuit 82, it is determined whether or not a count value corresponding to each wavelength reaches the number M of go-around preliminarily set. With respect to a wavelength whose count value does not reach the number M of go-around, the processing operation returns to Step 3, and the individual operations performed in Step 3 to Step 8 are repeated until the count value reaches the number M of go-around.

In Step 9, with respect to a wavelength whose count value has reached the number M of go-around, the measurement of the propagation time, started in Step 2 described above, is terminated, and a propagation time required for corresponding test light to be propagated in the system up to the number M of go-around is calculated. For example, in a case where the test light is caused to go round 1000 times in the system in which a distance between the terminal stations (the length of each of the transmission paths P1 and P2) is 100 km, it turns out that the propagation time includes times illustrated in the following terms (a) to (c).

(a) an optical propagation time corresponding to 100 [km]*2(go-round)*1.5(the refractive index of a transmission path)*1000(the number of go-around)=300000 [km]

(b) a time required for optical/electrical conversion performed 2(a pair of operations)*1000(the number of go-around)=2000 times (c) a time required for electrical/optical conversion performed 2(a pair of operations)*1000(the number of go-around)=2000 times Specifically, since the velocity of light is about 300000 [km/sec], the propagation time in the above-mentioned term (a) turns out to be 300000 [km]/300000 [km/sec]=1 [sec]. In addition, since a usual optical/electrical or electrical/optical conversion time is about 0.5 [μsec], the total of the conversion times turns out to be 2000 times*2*0.5 [μsec]=2 [msec]. In addition, the distance between the terminal stations and the number of go-around are not limited to the above-mentioned examples. The number of go-around may be arbitrarily set in response to the distance between the terminal stations and the measurement accuracy of the propagation time.

In Step 10, with respect to all wavelengths set for the test light, it is determined whether or not the measurement of the propagation time is completed. If there is a wavelength the propagation time of which is not completed, the processing operation returns to Step 7, and the propagation time of a corresponding test light is continued.

In Step 11, with respect to the measured propagation times of the test light of individual wavelengths, a propagation time difference between wavelengths is calculated. When the wavelength dispersion amount in the transmission paths P1 and P2 changes owing to environmental conditions such as a temperature change and the like or time degradation, the influence of the change on the propagation time of the test light of each wavelength occurs in only the propagation time in the term (a) from among time elements in the terms (a) to (c), and does not occur in the conversion times in the terms (b) and (c). Therefore, as illustrated in a conceptual diagram in FIG. 7, by calculating the propagation time difference between the wavelengths of the test light, the change of the wavelength dispersion amount in the transmission paths P1 and P2 and the direction thereof can be measured. In addition, when it is difficult to obtain a sufficient propagation time difference between two wavelengths owing to a reason such as the short distance between the terminal stations or the like, the problem may be dealt with by simply increasing the number M of go-around to be set.

Figure 8:
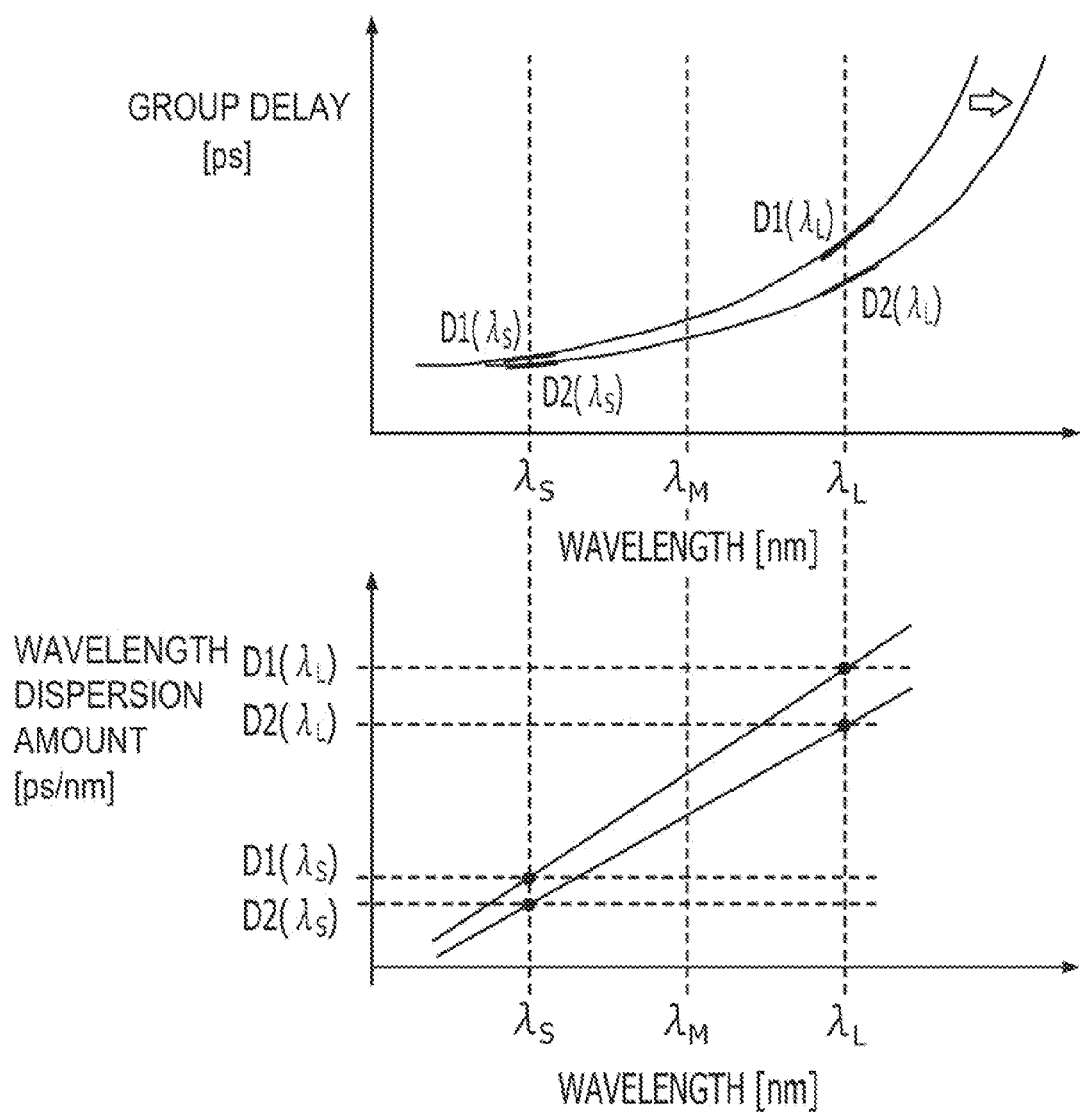
FIG. 8 is a diagram for explaining how a wavelength dispersion amount changes in a transmission path.

With respect to how a wavelength dispersion amount changes in the transmission paths P1 and P2, for example, as illustrated in FIG. 8, not only a relationship of a group delay to a wavelength shifts in a wavelength direction but also a dispersion coefficient (the slope of a straight line in a lower graph in FIG. 8) may change. If the wavelength dispersion amount in the transmission paths P1 and P2 after the start of the operation of the system has not changed from a wavelength dispersion amount occurring during system start-up, no significant difference between propagation times measured for the test light of individual wavelengths occurs because dispersion compensation amounts in the TDCs corresponding to the individual wavelengths have been optimized on the basis of the initial setting performed during system start-up. On the other hand, when the wavelength dispersion amount in the transmission paths P1 and P2 and the dispersion coefficient have changed after the start of the operation of the system, namely, in the example in FIG. 8, wavelength dispersion amounts $D1(\lambda_S)$ and $D1(\lambda_L)$ at wavelengths $\lambda_S$ and $\lambda_L$ before the change (during system start-up) have become wavelength dispersion amounts $D2(\lambda_S)$ and $D2(\lambda_L)$ after the change (during the operation of the system), respectively, a propagation time difference corresponding to the change occurs between the wavelengths of the test light. Accordingly, when, after the start of the operation, a propagation time difference between the wavelengths of the test light is monitored in a required measurement period and the propagation time difference exceeds a preliminarily set acceptable value, the dispersion compensation amount in each of the TDCs can be optimized in response to the change of the wavelength dispersion amount in the transmission paths P1 and P2, by compensating the dispersion compensation amount in each of the TDCs so that the propagation time difference approaches zero. In addition, the acceptable value of the propagation time difference can be arbitrarily set in response to the wavelength dispersion tolerance of an optical receiver.

When a propagation time differences between the wavelengths of the test light is calculated in the propagation time difference calculation circuit 82 in the wavelength dispersion measurement device 8 on the basis of the sequence of operations performed in Step 1 to Step 11 as described above, the calculated value is output, as the measurement information of the change of the wavelength dispersion amount, to the compensation amount calculation circuit 51 and the transmission light control circuit 13 in the terminal station. In addition, in the compensation amount calculation circuit 51, on the basis of the propagation time difference calculated in the propagation time difference calculation circuit 82, correction values for the dispersion compensation amounts in the TDCs $41_1$ to $41_N$ corresponding to individual wavelengths are calculated, and the calculation result is delivered to the compensation amount control circuit 52. In the compensation amount control circuit 52, in accordance with the correction values calculated in the compensation amount calculation circuit 51, the dispersion compensation amounts in the individual TDCs $41_1$ to $41_N$ are controlled.

In addition, in the transmission light control circuit 13 in the terminal station, with respect to an optical transmitter that has been used for generating the test light, the optical transmitter is controlled so that signal light containing the measurement information from the propagation time difference calculation circuit 82 is generated. In addition, when the signal light containing the measurement information is transmitted from the terminal station to the transmission path P2, is propagated through the transmission path P2, and is received by a corresponding optical receiver in the terminal station, the received signal is output to the measurement information reception circuit 63. In the measurement information reception circuit 63, the measurement information in the terminal station is acquired from the received signal, and the measurement information is delivered to the compensation amount calculation circuit 51 in the terminal station. In the compensation amount calculation circuit 51, on the basis of a propagation time difference indicated by the measurement information acquired in the measurement information reception circuit 63, correction values for the dispersion compensation amounts in the TDCs $41_1$ to $41_N$ corresponding to individual wavelengths are calculated, and the calculation result is delivered to the compensation amount control circuit 52. In the compensation amount control circuit 52, in accordance with the correction values calculated in the compensation amount calculation circuit 51, the dispersion compensation amounts in the individual TDCs $41_1$ to $41_N$ are controlled.

In addition, with respect to the period of the optimizing control for the dispersion compensation amounts in the individual TDCs $41_1$ to $41_N$, performed during the system operation, since, as described above, the wavelength dispersion characteristics of the transmission paths P1 and P2 due to environmental conditions or time degradation change over a relatively long term such as several hours, it is not particularly necessary to perform the optimizing control in short periods, and hence the optimizing control may be performed about one time in several hours. Taking the factor into consideration, the number of go-around of the test light may be increased, and the propagation time may be measured over time, thereby promoting accuracy improvement. Such promotion of the accuracy improvement is also useful.

Since, as described above, according to the optical transmission system in the present embodiment, a plurality of test lights, the wavelengths of which are different from one another are caused to go round between terminal stations facing to each other through a pair of transmission paths P1 and P2, the test light is not blocked by an optical isolator connected to an optical amplifier even if the optical amplifier is disposed on a propagation path for the test light. In addition, when the test light going round in the system is received by each terminal station, the test light is once converted into an electrical signal, and, after that, the electrical signal is reconverted into test light and transmitted to a transmission path. Therefore, even if the number of go-around increases, the power of the test light is not reduced. Furthermore, since the DCF 32 and TDCs 41$_1$ to 41$_N$ disposed on the receiving side of each terminal station also compensate the wavelength dispersion of the test light in the same way as the currently operated signal light, the waveform distortion of the test light due to the wavelength dispersion does not occur with increase in the number of go-around. Therefore, the number of go-around of the test light of each wavelength can be reliably counted, and hence the propagation time required for the number M of go-around can be correctly measured. Accordingly, using the propagation time difference between the wavelengths of the test light as a parameter, the change of the wavelength dispersion amount in the transmission paths P1 and P2 can be easily measured with high accuracy. In addition, by optimizing a dispersion compensation amount in each of the TDCs 41$_1$ to 41$_N$ in response to the measurement result, the currently operated signal light can be stably received even if the change of the wavelength dispersion amount in the transmission paths P1 and P2 occurs during the system operation. Since, with respect to such optimization of the dispersion compensation amount, the direction thereof can be determined without increasing and decreasing the dispersion compensation amount in an existing way, a situation in which the limit of error correction is exceeded and hence the optimization becomes difficult to perform can also be avoided.

Figure 9:
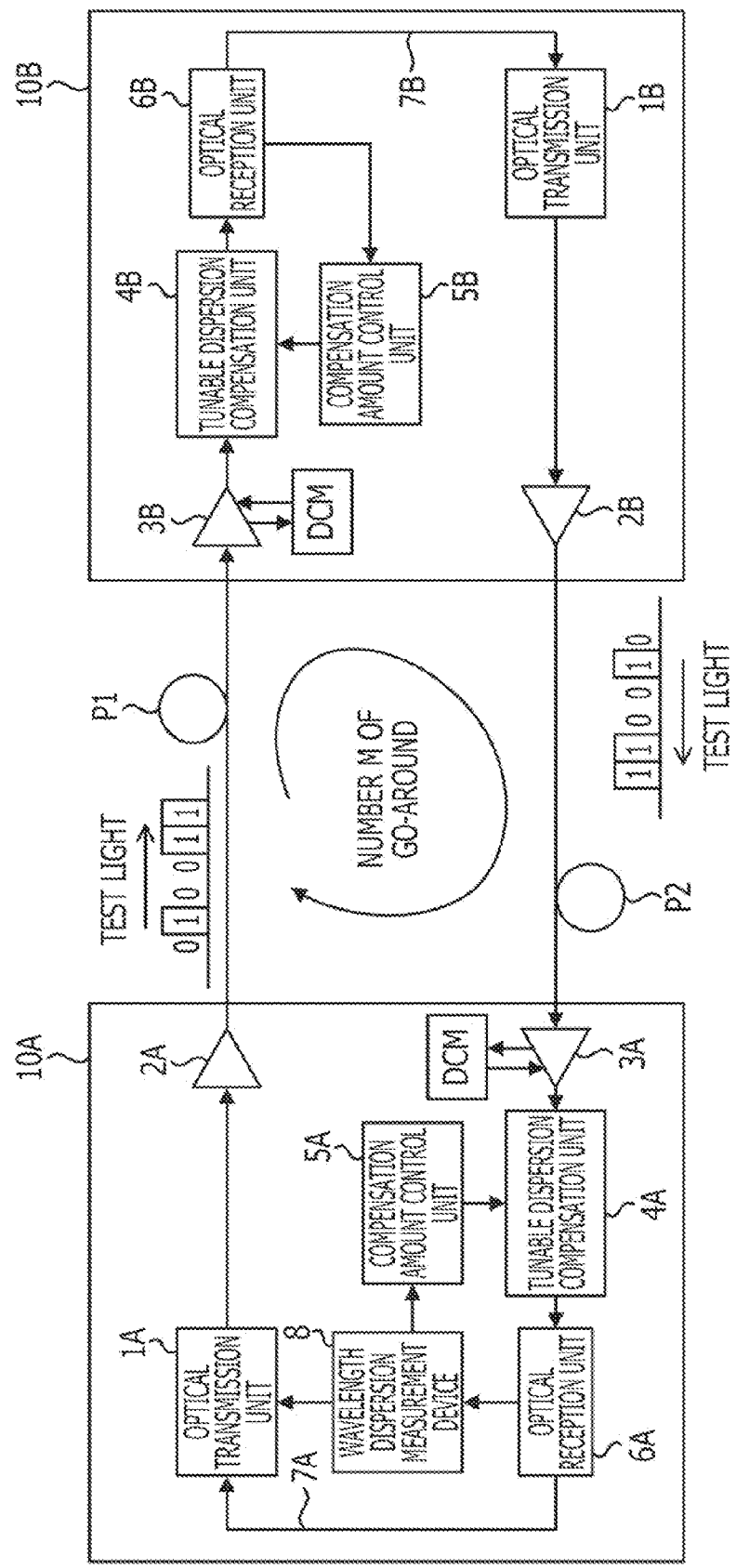
FIG. 9 is a block diagram illustrating an example of a modification relating to the embodiment.

In addition, in the optical transmission system according to the above-described embodiment, the wavelength dispersion measurement device 8 (the counting circuit 81 and the propagation time difference calculation circuit 82) is disposed in the terminal station, and the measurement of the propagation time is started when the test light transmitted from the terminal station to the transmission path P1 is received by the terminal station. However, for example, as illustrated in FIG. 9, the wavelength dispersion measurement device 8 is disposed in the terminal station 10A, a time when the optical transmission unit 1A in the terminal station 10 transmits the test light is counted as the start of the measurement of the propagation time, and the count value (the number of go-around) may be incremented by one under a condition that the test light is propagated through the transmission path P1, the terminal station 10B, and the transmission path P2, and is received by the terminal station 10A.

In addition, in the embodiment, since the test light is transmitted using the unused channel of the WDM light, it may be assumed that the operation of the signal light that uses a wavelength corresponding to the unused channel is started during the measurement of the propagation time of the test light. At that time, it is necessary to switch the test light to another unused channel different from the corresponding wavelength. In this case, at the time of the switching of the wavelength of the test light, by measuring a propagation time required for the number m of go-round (m<M) with respect to each wavelength before and after the switching, a relationship between both wavelengths is obtained. In addition, by using the relationship, a propagation time measured before the switching may be converted into a propagation time corresponding to a wavelength after the switching, and hence the measurement result may be took over. Accordingly, by flexibly coping with the switching of an operation wavelength, the propagation time of the test light can be efficiently measured. In addition, when an optical transmitter and an optical receiver, dedicated to the test light, are used without using an unused channel, such switching of the wavelength of the test light as described above is not necessary.

Figure 10:
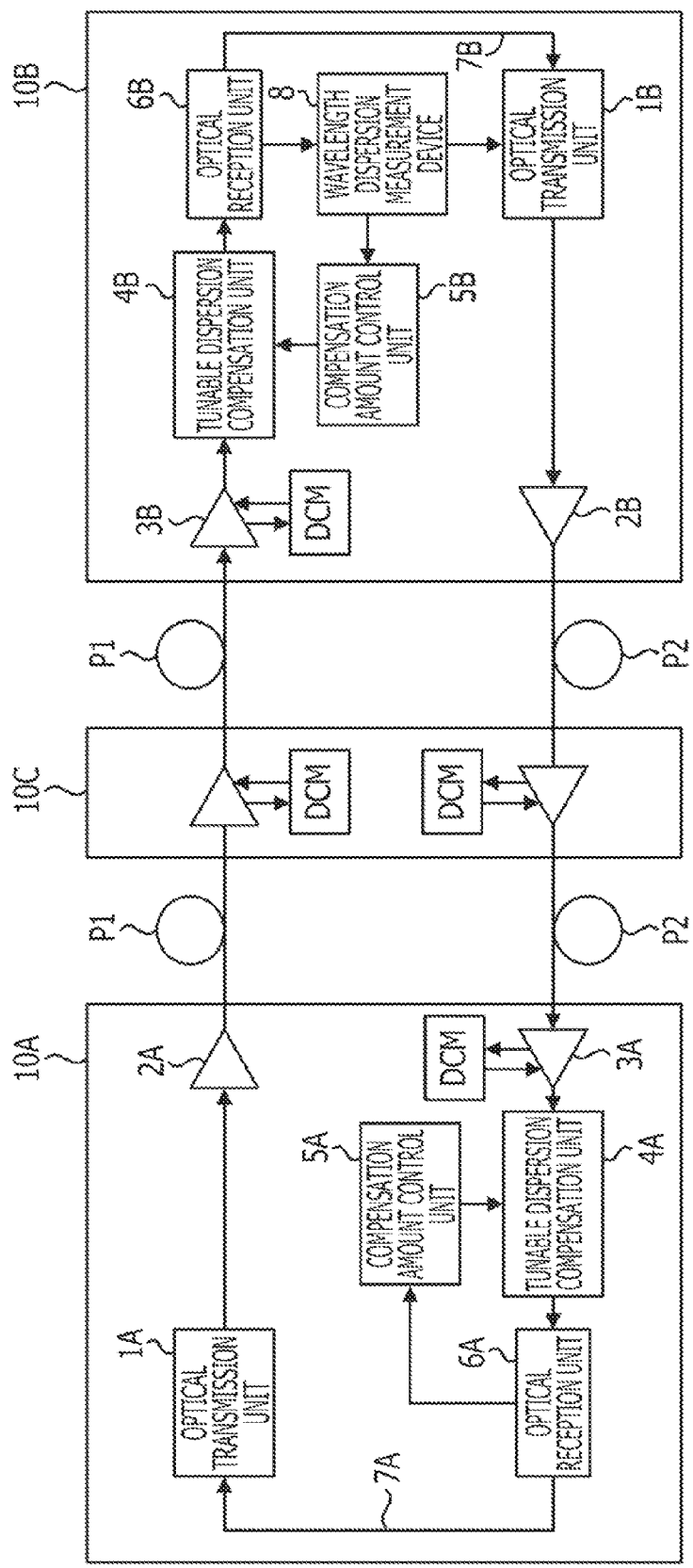
FIG. 10 is a block diagram illustrating another example of a configuration that includes a relay station relating to the embodiment.

In addition, in the above-mentioned embodiment, the system configuration has been described in which the terminal stations 10A and 10B are directly connected to each other through the pair of transmission paths P1 and P2. However, for example, as illustrated in FIG. 10, the embodiments are also beneficial to a system configuration in which a relay station 10C including an in-line amplifier is disposed on the transmission paths P1 and P2. The relay station 10C applied to a usual optical transmission system is equipped with a fixed dispersion compensator (DCM) used for collectively compensating the wavelength dispersion of the WDM light. In addition, the test light multiplexed into the WDM light passes through the in-line amplifier and the DCM in the relay station 10C, and is relay-transmitted between the terminal stations 10A and 10B. Therefore, in the same way as the currently operated signal light, the test light, the loss in the transmission path and the wavelength dispersion of which are compensated, turns out to go round in the system, and the optimization of the dispersion compensation amount in the TDC can be performed using the measurement result of the change of the wavelength dispersion amount in the same way as in the above-mentioned embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A wavelength dispersion measurement method with respect to an optical transmission system in which signal light transmitted from a first terminal station and propagated through a first transmission path is received by a second terminal station, and signal light transmitted from the second terminal station and propagated through a second transmission path different from the first transmission path is received by the first terminal station, the wavelength dispersion measurement method comprising:

generating a plurality of test lights in the first terminal, the wavelengths of which are different from a wavelength of the signal light propagated between the first and the second terminal stations;

multiplexing each test light with the signal light and outputting the multiplexed light from the first terminal station to the first transmission path;

reconverting each electrical signal into each test light after receiving in the second terminal station each test light propagated through the first transmission path and converting each test light into electrical signals;

multiplexing each test light with the signal light and outputting the multiplexed light from the second terminal station to the second transmission path;

reconverting each electrical signal into the each test light after receiving in the first terminal station each test light propagated through the second transmission path and converting each test light into electrical signals;

multiplexing each test light with the signal light and outputting the multiplexed light from the first terminal station to the first transmission path;

measuring times for each test light to be propagated up to a specified number of go-around, with respect to each wavelength; and measuring a change of a wavelength dispersion amount in the first and the second transmission paths based on a difference between the measured propagation times of each wavelengths.

2. A device with respect to an optical transmission system in which signal light transmitted from a first terminal station and propagated through a first transmission path is received by a second terminal station, and signal light transmitted from the second terminal station and propagated through a second transmission path different from the first transmission path is received by the first terminal station, the device comprising:

generating a plurality of test lights in the first terminal, the wavelengths of which are different from a wavelength of the signal light propagated between the first and the second terminal stations;

multiplexing each test light with the signal light and outputting the multiplexed light from the first terminal station to the first transmission path;

reconverting each electrical signal into the each test light after receiving in the second terminal station each test light propagated through the first transmission path and converting each test light into electrical signals;

multiplexing each test light with the signal light and outputting the multiplexed light from the second terminal station to the second transmission path;

furthermore, reconverting each electrical signal into each test light after receiving in the first terminal station each test light propagated through the second transmission path and converting each test light into electrical signals;

multiplexing each test light with the signal light and outputting the multiplexed light from the first terminal station to the first transmission path;

measuring times for each test light to be propagated up to a specified number of go-around, with respect to each wavelength; and measuring a change of a wavelength dispersion amount in the first and the second transmission paths based on a difference between the measured propagation times of each wavelength.

3. An optical transmission system in which signal light output from a first terminal station and propagated through a first transmission path is received by a second terminal station, and signal light output from the second terminal station and propagated through a second transmission path different from the first transmission path is received by the first terminal station, the optical transmission system comprising:

a wavelength dispersion measurement device configured to measure the changes of wavelength dispersion characteristics of the first and the second transmission paths, wherein each of the first and the second terminal stations include
an optical transmitter capable of generating signal lights and a plurality of test lights, the wavelengths of which are different from a wavelength of the signal lights, propagated between the first and the second terminal stations, and configured to multiplex each test light with the signal light and output the multiplexed light to one of the first and the second transmission paths,
a tunable dispersion compensator configured to be supplied with light propagated through the other of the first and the second transmission paths and variably compensate the wavelength dispersion of the light,
a compensation amount controller configured to control a dispersion compensation amount in the tunable dispersion compensator,
an optical receiver configured to receive light the dispersion of which is compensated in the tunable dispersion compensator, and
a signal path configured to transmit an electrical signal, into which each of the test light is converted, to the optical transmitter in a same terminal station when the optical receiver receives each of the test light, thereby causing each of the test light into which the electrical signal is reconverted to be generated in the optical transmitter, wherein the wavelength dispersion measurement device measures times required for the test light, which is to go round between the first and the second terminal stations through the first and the second transmission paths, to be propagated up to a specified number of go-around, with respect to each wavelength, and deliver, as measurement information relating to the change of a wavelength dispersion amount in the first and the second transmission paths, a difference between the measured propagation times of each wavelength to the compensation amount controller in each of the first and the second terminal stations, and the compensation amount controller controls the dispersion compensation amount in the tunable dispersion compensator based on the measurement information from the wavelength dispersion measurement device.

4. The optical transmission system according to claim 3, wherein
a dispersion compensation amount is initially set in the tunable dispersion compensator in response to the wavelength dispersion characteristics of the first and the second transmission paths during system start-up,
the wavelength dispersion measurement device measures a propagation time of each of the test light in accordance with a specified measurement period, after a system operation is started, and
the compensation amount controller corrects an initial setting value for the dispersion compensation amount in the tunable dispersion compensator on the basis of the measurement information from the wavelength dispersion measurement device.

5. The optical transmission system according to claim 3, wherein
each of the first and the second terminal stations includes
a transmitting-side optical amplifier configured to amplify light to be output from the optical transmitter to one of the first and the second transmission paths, and
a receiving-side optical amplifier configured to amplify light to be propagated through the other of the first and the second transmission paths and supplied to the tunable dispersion compensator.

6. The optical transmission system according to claim 5, wherein
each of the transmitting-side optical amplifier and the receiving-side optical amplifier includes an optical isolator.

7. The optical transmission system according to claim 5, wherein
the receiving-side optical amplifier includes a fixed dispersion compensator.

8. The optical transmission system according to claim 3, wherein
wavelength division multiplexing light including a plurality of signal lights, the wavelengths of which are different from one another is transmitted and received to and from the first and the second terminal stations, and each of the test light is transmitted using an unused channel of the wavelength division multiplexing light.

9. The optical transmission system according to claim 8, wherein when the unused channel used for transmitting each of the test light is switched, the wavelength dispersion measurement device obtains a relationship between propagation times with respect to each wavelength before and after the switching, and, by using the relationship, converts a propagation time measured before the switching into a propagation time corresponding to a wavelength after the switching, thereby taking over a measurement result.

10. The optical transmission system according to claim 3, wherein wavelength division multiplexing light including a plurality of signal lights, the wavelengths of which are different from one another is transmitted and received to and from the first and the second terminal stations, and the wavelength of each of the test light is set at least in the vicinity of a shortest wavelength of the wavelength division multiplexing light and the vicinity of a longest wavelength of the wavelength division multiplexing light.

11. The optical transmission system according to claim 3, wherein each of the test light includes a pseudo random pattern.

12. The optical transmission system according to claim 3, wherein the wavelength dispersion measurement device includes a counting circuit configured to count the number of go-around of each of the test light, and a propagation time difference calculation circuit configured to measure, in response to a count value of the counting circuit, a time required for each of the test light to be propagated up to a specified number of go-around, with respect to each wavelength, calculate a difference between the measured propagation times of each wavelength, and deliver the calculation result, as the measurement information, to the compensation amount controller in each of the first and the second terminal stations.

13. The optical transmission system according to claim 3, further comprising:

a relay station configured to include an in-line amplifier and a fixed dispersion compensator on the first and the second transmission paths.

* * * * *